(No Model.)
S. BASFORD.
TIRE TIGHTENER.
No. 274,701. Patented Mar. 27, 1883.
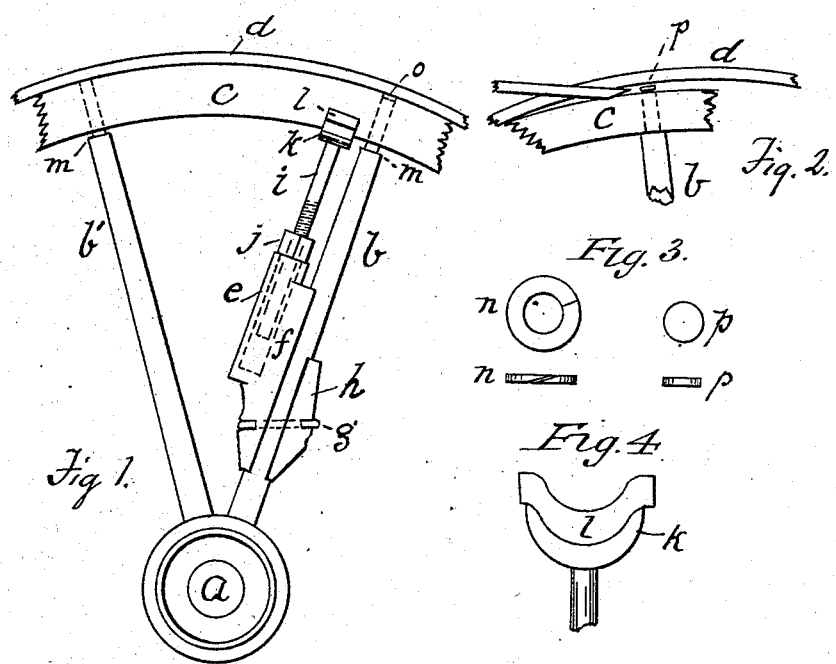

UNITED STATES PATENT OFFICE.

SUMNER BASFORD, OF BANGOR, MAINE.

TIRE-TIGHTENER.

SPECIFICATION forming part of Letters Patent No. 274,701, dated March 27, 1883.

Application filed August 25, 1882. (No model.)

*To all whom it may concern:*

Be it known that I, SUMNER BASFORD, of Bangor, in the county of Penobscot and State of Maine, have invented certain new and useful Improvements in Tire-Tighteners; and I do hereby declare that the following is a full, clear, and exact description of the invention, that will enable others skilled in the art to which it appertains to make and use the same, reference being had to the accompanying drawings, forming a part of this specification, in which—

Figure 1 shows a side elevation of my invention; Fig. 2, the process of inserting disk to lengthen spoke; Fig. 3, the washer and disk used; Fig. 4, a detailed view of the crutch enlarged.

Same letters show like parts.

My invention consists, first, in an improved device for tightening the tires of vehicles, which shall be applicable without change to all ordinary varieties and sizes of wheels without the necessity of removing said wheels or tires; and, second, in devices for filling the cavities between the ends of the spokes and the tire, occasioned by the increase in the diameter of the felly by the operation of tightening the tire.

The drawings will illustrate my invention. At $a$ is shown the hub of the wheel; $b$ $b'$, two of the spokes; $c$, a portion of the felly, and $d$ the tire. At $e$ is a metal cylinder or socket, having on one side a projection, $f$, slightly concaved upon its face to fit the face of the spoke $b$, to which it is secured by the split link $g$ and wedge $h$, as shown. Within the cylinder, and projecting from its upper end, is a screw-bolt, $i$, having a nut, $j$, thereon, bearing upon the top of the cylinder or socket, and provided at its upper end with a crutch-shaped bearing, $k$, adapted to fit under the felly of the wheel. This crutch-shaped bearing—and I claim this feature as new—may, if desired, be fitted with a thick rubber fender or lining, $l$, which, by its elasticity, may adapt itself to fellies of varying curves in cross-section.

To operate my device, the cylinder is fixed firmly in position on the spoke and the bolt turned up until the crutch bears under the felly of the wheel. The wrench is then applied until the felly is sufficiently raised. This of course lifts it from the shoulder $m$ on the end of the spoke next the felly, and to retain it in this position I insert a split washer, $n$. The machine may then be released and transferred to another spoke, and the operation repeated until the tire is sufficiently tight. It will be evident that a thread might be cut on the interior of the cylinder $e$, in which the bolt might work, the bearing $k$ revolving loosely upon the end of the bolt and the nut $j$ being made a part of said bolt; but this would be but a colorable variation of my invention.

It is apparent that the operation above described, increasing the diameter of the felly, naturally leaves a cavity, $o$, between the tire and the end of the spoke, which in some cases may be undesirable. To obviate this I provide disks of leather or other suitable material, $p$, of the proper size to fit the ends of the spokes, and previous to tightening the tire, as heretofore described, I raise it from the felly by inserting a chisel or wedge, and insert a disk of the proper thickness between felly and tire and directly over the end of the spoke. This disk, when the tire is subsequently tightened, drops into the cavity $o$, filling it and virtually lengthening the spoke. As many of these disks may be used on a wheel as may be required.

My tire-tightener possesses great advantages over those now in use, from the fact that it works against the inner circumference of the felly, pushing instead of drawing it, and is therefore applicable to wheels varying greatly in width without change, which is unavoidable when clasps or stirrups embracing the felly and tire are employed.

What I claim as my invention is—

1. In a tire-tightener, the cylinder or socket $e$, secured to the face of the spoke by means of the split link $g$ and wedge $h$, as shown, in combination with the screw-bolt $i$ and nut $j$, or equivalent devices, all arranged within the inner circumference of the felly and operating to enlarge the same, substantially as and for the purposes set forth.

2. In a tire-tightener provided with a crutch-shaped bearing or like device adapted to clasp the under side of the wheel-felly, the rubber lining or fender r, combined with said bearing, substantially as and for the described purposes.

3. In combination with a tire-tightener operating to tighten the tires of wheels by increasing the diameter of the fellies, the disks p, adapted to fit into and fill the cavities o between the ends of the spokes and the tires, as set forth.

In testimony that I claim the foregoing I have hereunto set my hand this 20th day of June, 1882.

SUMNER BASFORD.

Witnesses:
JOHN A. BARRY,
WM. FRANKLIN SEAVEY.